United States Patent Office 2,951,853
Patented Sept. 6, 1960

2,951,853
METHOD FOR PREPARING POLYENE-CARBOXYLIC ACID DERIVATIVES

Masanao Matsui, Tokyo, Japan, assignor to Sumitomo Chemical Company, Ltd., Higashi-ku, Osaka, Japan, a corporation of Japan No Drawing. Filed May 27, 1958, Ser. No. 738,044
Claims priority, application Japan June 8, 1957
13 Claims. (Cl. 260—347.5)

This invention relates to a method for preparing polyene-carboxylic acid derivatives. More particularly, the invention is concerned with a method for preparing polyene-carboxylic acid derivatives comprising reacting an aldehyde with a senecioic ($\beta,\beta$-dimethylacrylic) acid derivative in the presence of a specific kind of basic condensing agent. Furthermore, the present invention relates to a method which comprises condensing $\beta$-ionylidene-acetaldehyde with a senecioic acid derivative in the presence of a specific basic condensing catalyst, and, if necessary, reducing thus obtained vitamin A acid derivative to a vitamin A compound.

Speaking of the reaction of aldehydes with senecioic acid derivatives, merely a case has been known up to the date, in which benzaldehyde was condensed with senecioic anhydride in the presence of trimethylamine catalyst to produce $\alpha$-isopropylcinnamic acid in 38% yield (cf. Ishikawa and Kato: Sci. Repts. Tokyo Bunrika Daigaku, I, 289 (1935); C.A. 28, 2698 (1934)). As for the similar reaction, it has also been known that $\alpha$-vinyl-cinnamic acid was obtained in 40% yield by the condensation of benzaldehyde with crotonic anhydride in the presence of triethylamine catalyst (cf. Kuhn and Ishikawa: Ber. 64, 2347 (1931)).

According to the study of the present inventor in this field, it has now been found that, when a comparatively strong basic catalyst is employed instead of the organic base which was used up to the time and considered to be a member of weak basic condensing catalyst, polyene-carboxylic acid derivatives are obtained in an excellent yield by the condensation of aldehydes with senecioic acid derivatives as a following equation:

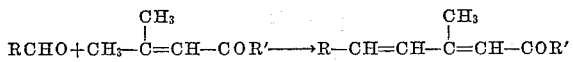

wherein R is a hydrocarbon residue, optionally substituted with a group (or groups) not to participate with this reaction, and R′ is a member selected from the group consisting of alkoxy and —NR$^1$R$^2$, in which R$^1$ and R$^2$ are respectively selected from the group consisting of hydrogen and hydrocarbon residues. As the present reaction is proceeded by the condensation of one of the terminal methyl groups of the senecioic acid derivative, which is activated by the carboxyl group through the double bond, with an aldehyde group accompanying with dehydration in the presence of the condensing catalyst identified in the present invention, the reaction of the present invention may be considered to be a modification of the Claisen's condensation reaction.

Thus, according to the method of this invention, it may be quite possible to elongate a C$_5$-chain by direct introduction of an isoprenic chain to various compounds containing an aldehyde group, and the present invention may be applied very advantageously to the manufacture of various naturally existing isoprenic compounds including perfumes belonging to mono-, sesqui- and diterpene series, vitamin A, and synthetic substitutes resembling to them and the like.

In accordance with the study of the inventor, the method of this invention is particularly useful to be applied to the synthesis of vitamin A compounds. For example, in a preferred embodiment of the invention, $\beta$-ionylidene-acetaldehyde can be easily converted into vitamin A acid derivatives in good yield according to the following equation:

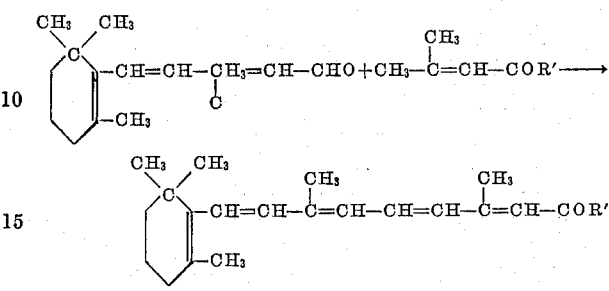

in which R′ is the same meaning as stated above. The inventor has further found that, as the vitamin A acid derivatives of required steric configurations can be obtained in accordance with the method of this invention, they may be directly converted into pure vitamin A or other vitamin A compounds of required steric configurations without difficulty by means of an ordinary reduction method.

It is accordingly an object of this invention to provide a new method of synthesizing polyene-carboxylic acid derivatives by the condensation of an aldehyde with a senecioic acid derivative in the presence of a specific kind of basic condensing agent.

It is a further object of the invention to provide a new process of increasing isoprenic chain, and thereby provide an applicable method of preparing various naturally occurring compounds, their synthetic substitutes and their intermediates.

Another object of the invention is to provide a new manufacturing process of vitamin A acid derivatives and vitamin A compounds.

Another object of the invention is to provide a commercially feasible method in respects of yield and operation for the manufacture of vitamin A having a desired steric configuration.

Other objects and advantages will be apparent from the following description and the claims.

To attain the above-mentioned objects, a method for preparing polyene-carboxylic acid derivatives is provided in the invention, which method comprises that an aldehyde is reacted with a member selected from the group consisting of senecioic acid esters and senecio-amides in an inactive solvent in the presence of one or more basic condensing agents selected from the group consisting of metallic alkali, alkali amide, alkali hydride and organo-alkali compounds.

Speaking of a preferred embodiment of this invention, a method for preparing vitamin A compound comprising that a $\beta$-ionylideneacetaldehyde is reacted with a member selected from the group consisting of senecioic acid esters and senecio-amides in an inactive solvent in the presence of one or more basic condensing agents selected from the group consisting of metallic alkali, alkali amide, alkali hydride and organo-alkali compounds, and if necessary thus obtained vitamin A acid derivative is reduced to a vitamin A compound, is provided in this invention.

As mentioned above, the method of this invention is concerned widely with the condensation of aldehydes with senecioic acid derivatives, and especially has a preferable application to the manufacture of vitamin A. Considering the invention in this respect, this method for preparing vitamin A has many advantages over the methods used heretofore.

A number of methods for preparing vitamin A has heretofore been reported. For example, it has been known to prepare vitamin A acid by condensing β-ionylvinyl methyl ketone with an ester of bromacetic acid in the presence of zinc, the so-called method of D. A. van Dorp (cf. Rec. Trav. Chim., 65, 338 (1946)). It has been further known to prepare vitamin A acid by condensing β-ionylideneacetaldehyde with an ester of ω-bromo-senecioic acid in the presence of zinc, the so-called method of K. Ueno (cf. J.P. 200,909). Furthermore, the method of C. D. Robeson and J. D. Cawley which consists of condensing β-ionylideneacetaldehyde with an ester of β-methylglutaconic acid in the presence of a basic condensing agent and decarboxylating the product thus obtained to vitamin A acid (cf. J.P. 218,964), and the method of C. D. Robeson which consists of condensing β-ionylideneacetaldehyde with an ester of isopropylidenemalonic acid in the presence of a caustic alkali and then decarboxylating the product of the condensation to vitamin A acid (cf. U.S.P. 2,662,914) have been known. And, in general, the vitamin A acid obtained in accordance with these methods has been converted into vitamin A by the reduction with lithium aluminum hydride.

In those above described methods, the methods of Robeson and Cawley are regarded considerably to be the most profitable for the synthesis of vitamin A acid. But the steric configuration of thus obtained vitamin A acid is always 2-cis-isomer at the site of the double bond in the chain, and consequently, for the obtainment of the all-trans-isomer having the powerful biological activity, the 2-cis-isomer should be isomerized by an appropriate means, and the yield of this isomerisation process is not so good. Furthermore, a total yield of all processes according to them is also not satisfactory and particularly the process of decarboxylation is regarded to be practically the weak point of these methods. Consequently, there remains room for improvements in those works on the points of yield and purity of vitamin A having an absorption maximum of about 330 mμ.

Over against these, in case of the method of this invention to prepare vitamin A acid derivatives, an objective compound having a required steric configuration can be obtained in excellent yield by only one step, and the product thus obtained can be directly converted to pure vitamin A compound by reduction. The terms "vitamin A compound" in this description and the claims involve all of the various stereo-isomers of natural vitamin A.

Basic condensing agents employed for the condensation of aldehydes with senecioic acid derivatives in this invention are selected from the group consisting of metallic alkali, alkali amide, alkali hydride and organo-alkali compounds. Examples of suitable basic condensing agents include sodium, potassium, lithium, sodium amide, potassium amide, lithium amide, sodium hydride, potassium hydride, phenylsodium, phenyllithium, triphenylmethylsodium, triphenylmethylpotassium, and the like. Of these agents, alkali amide is the most preferable one.

In practicing the method of this invention by using such condensing agents, the present inventor has found the following facts about the relation between the steric configuration of obtained products and the kind of employed condensing agents. That is, in the condensation of ionylideneacetaldehyde with senecioic acid derivatives using said basic condensing agents, potassium and its compounds gave principally the vitamin A acid derivatives of 2,4-di-trans-configuration as illustrated in the formula:

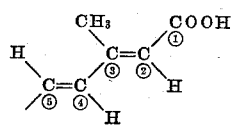

whereas sodium, lithium and their compounds gave principally the vitamin A acid derivatives of 2-cis-4-trans-configuration as illustrated in the formula:

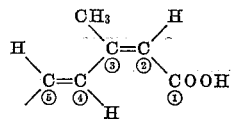

Consequently, it is quite possible to obtain a vitamin A acid derivative having any steric configuration by the selections of the steric configuration of employed β-ionylideneacetaldehyde and the kind of employed condensing agent, and thus, vitamin A compound having a desired configuration can be readily obtained by the reduction of thus obtained intermediate. Of course, due to the consideration of the balance between economical viewpoint and the desired biological activity of the product, it may be possible to obtain the mixture of steric isomers by using a mixture of two or more of the catalysts.

The inventor has also found that, in practicing the method of the present invention other than vitamin A acid, said condensing agents gave principally a polyene-carboxylic acid having either 2,4-di-trans or 2-trans-4-cis-configuration according to the conditions as illustrated in the formulas:

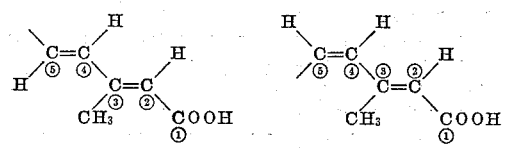

It is impossible to explain theoretically about such a correlation between condensing conditions and steric configurations. And when the resulting polyene-carboxylic acid is liquid, the steric configuration of such liquid is unknown. However, the method of this invention includes widely the thought of obtaining polyene-carboxylic acid derivatives by reacting an aldehyde and a senecioic acid derivative in the presence of an above-defined basic condensing agent regardless of the respects of steric configurations.

The senecioic acid derivative to be able to employ in the invention is selected from the group consisting of senecioic acid esters and senecio-amides, and is shown by the following general formula:

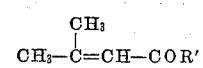

wherein R' represents an alkoxy or —NR¹R², and R¹ and R² respectively stand for a hydrogen or a hydrocarbon residue. Suitable alkoxy groups in said general formula include methoxy, ethoxy, n-proproxy, iso-proproxy, butoxy, octoxy and the like. R¹ and R² include respectively H, an alkyl group such as methyl, ethyl, propyl, butyl, octyl and the like, an alkenyl group, a cycloalkyl group, phenyl group and benzyl group, and also R¹ and R² may form a ring together with N atom such as pyrrolidyl, piperidyl and the like. Of said senecioic acid derivatives, senecioic acid esters (especially lower-alkyl esters) are preferable in the present invention. In the case of senecio amides, with its solubility to the employed inactive solvent in mind, it is preferable to use an amide of —NR¹R² having considerably a large molecular weight.

Aldehydes which may be employed in the present invention involve the compounds having the structure R—CHO, wherein R is, in general, a hydrocarbon residue, which may optionally be substituted with the group (or groups) not to participate in the reaction of this invention. Typical examples of these compounds embraced in said formula are propylaldehyde, n-butylaldehyde, isobutylaldehyde, valeraldehyde, isovaleraldehyde, n-hexylaldehyde, isohexylaldehyde, acrolein, crotonaldehyde, β,β-dimethylacrolein, citral, citronellal, benzaldehyde, cinnamic aldehyde, α- and β-ionylideneacetaldehyde and the like.

In practicing this invention, above mentioned reactants are reacted in the presence of above mentioned condensing agent (or agents) in an inactive solvent such as liquid ammonia, ethers and the like. As the mechanism of this reaction belongs to the same category as that of the Claisen's condensation of aldehydes with esters, the general conditions other than reactants and condensing agents defined in the invention would be easily chosen by those skilled in the art.

In a preferred embodiment of this invention, a vitamin A acid derivative having any steric configuration may be obtained by the selection of said condensing agents as previously described in detail, so that a vitamin A having a desired configuration may also be obtained by the direct reduction of thus prepared product. When the —COR' group of starting material or the product obtained in accordance to this invention is ester, the resulting vitamin A acid derivative may be reduced directly to a vitamin A compound, but in general, the following operations are preferred for the manufacture of a vitamin A compound, that is, the vitamin A acid derivative obtained in the present invention is converted to a crystalline vitamin A acid by hydrolysis, purified and then reduced to a vitamin A compound, or, after converting said purified vitamin A acid to an ester or another reducible derivative, the resulting product is reduced to a vitamin A compound. Said reduction is preferably carried out by using an ether-soluble metallic hydride such as lithium aluminum hydride, aluminum hydride, lithium borohydride, and dialkylaluminum hydride. This reaction proceeds quantitatively and thus obtained vitamin A compound is extremely pure, having an absorption maximum at 325 mμ.

Certain preferred embodiments of the invention are illustrated by the following examples, it being understood that the invention is equally applicable to other aldehydes and senecioic acid derivatives in the scope of the invention.

Example 1

To a suspension of sodium amide (7.8 grams) in anhydrous ethyl ether (50 cc.) was added dropwise a mixture of benzaldehyde (10 grams) and methyl senecioate (12 grams). With the addition of said mixture to said suspension, a violent exothermic reaction began. When the addition was over, the resulting solution was allowed to stand for 24 hours at room temperature. Thereafter, 100 cc. of ethanol was added to it to decompose the excess amount of sodium amide, and then 100 cc. of water was added. After removal of the majorities of ethyl ether and ethanol on a water-bath, the remaining solution was extracted with ethyl ether to remove the unreacted neutral parts. The aqueous layer thus obtained was acidified with sulfuric acid and extracted with ethyl ether. The ethereal extract was washed with water and dried. The removal of the solvent yielded a concentrated oily product, weighing 14 grams. As the oily product began to crystallize after a while, a small amount of benzene was added to them and the crystalline mass was separated by filtration, after which the mass was washed with a small amount of benzene. Thus, 10 grams of colorless acid, M.P. 150–155° C. was obtained. It was recrystallized from benzene, M.P. 156° C. As the result of its elementary analysis and the depression test of the melting point admixed with the authentic compound, this was found to be identical with 2-trans-4-cis-3-methyl-5-phenyl-2,4-pentadienic acid. (Analysis.— Calculated for $C_{12}H_{12}O_2$: C, 72.7%; H, 6.1%. Found: C, 73.0%; H, 6.2%.) $\lambda_{max}$ 307 mμ, $\epsilon_{max}$ 30,400. This product was converted into the all-trans-isomer, M.P. 160° C., $\lambda_{max}$ 302 mμ, $\epsilon_{max}$ 31,000 (in ethanol) by treating with an extremely small amount of iodine and room light. Furthermore, from said mother liquid obtained when separating the crude cis-acid, 1 gram of crystalline mass was obtained.

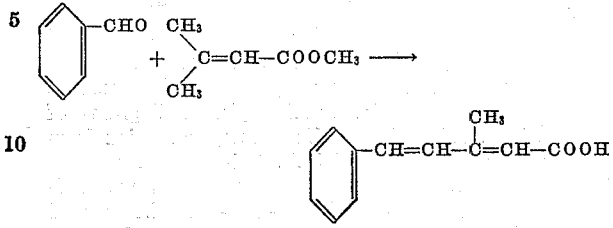

Example 2

To a solution of 5.3 grams of potassium amide in 150 cc. of liquid ammonia was added a mixture of 4.4 grams of benzaldehyde and 5.3 grams of ethyl senecioate. After standing for 24 hours, ammonia was evaporated, 100 cc. of methanol was added and the solution was refluxed for 1 hour with 10 cc. of water. Thereafter, the solution was diluted with 50 cc. of water, the solvent was removed by evaporation and the residue was extracted with ethyl ether to remove the unreacted neutral parts. The remaining aqueous layer was acidified with hydrochloric acid and extracted with ethyl ether. After washing with water, the solvent was evaporated to yield 9.5 grams of oily product which solidified after a while. Upon recrystallization from benzene, 7 grams of 2,4-di-trans-3-methyl-5-phenyl-2,4-pentadienic acid, M.P. 160°, $\lambda_{max}$ 302 mμ, $\epsilon_{max}$ 31,000 (in ethanol) was obtained.

Example 3

To a suspension of 3 grams of sodium amide in 70 cc. of anhydrous ethyl ether was added dropwise a mixture of 7 grams of trans-cinnamic aldehyde and 7 grams of ethyl senecioate with stirring. After standing for 24 hours at room temperature, the solution was treated in the same manner as described in Example 1, and 10 grams of acid was obtained as an oily product. To this was added a small amount of benzene, and the solution thus obtained was allowed to stand in a refrigerator. Six grams of crystalline mass, M.P. about 100° C., was obtained, from which 4 grams of pale yellow crystals, M.P. 190° C., was obtained by recrystallization from benzene. This product was found to be identical with 2,6 - di - trans - 4 - cis - 3 - methyl - 7 - phenylhepta-2,4,6-trienic acid from its analytical result. (Calculated for $C_{14}H_{14}O_2$: C, 78.5%; H, 6.5%. Found: C, 79.8%; H, 7.0%.) The cis-acid was dissolved into benzene. To this benzene solution was added an extremely small amount of iodine and the mixture was treated for 1 hour with daylight passed through a glass. The solution was concentrated to crystallize the product. Thus, the all-trans-isomer, M.P. 200° C., was obtained as pale yellow crystals.

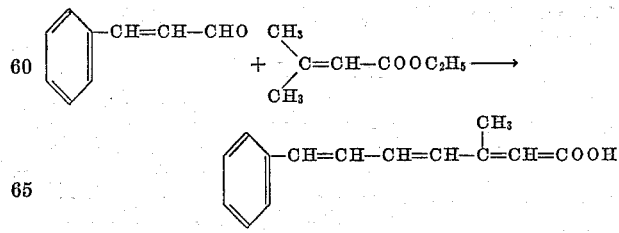

(Analysis.—Calculated for $C_{14}H_{14}O_2$: C, 78.5%; H, 6.5%. Found: C, 79.6%; H, 6.8%.)

Example 4

To a solution of 2.5 grams of sodium amide in 150 cc. of liquid ammonium was added a mixture of 5 grams of transcinnamic aldehyde and 5 grams of ethyl senecioate. After standing for 24 hours and evaporating ammonia, water was added dropwise with attention to decompose the excess amount of sodium amide and then the mixture was extracted with ethyl ether to remove the unreacted neutral parts. Thereafter, the aqueous layer was acidified with hydrochloric acid to precipitate the crystalline mass. The product was extracted with ethyl ether, and the ethereal extract was washed with water and dried over anhydrous sodium sulfate. The concentration of the solution yielded 7 grams of crystals, M.P. 172–178° C. Upon recrystallization from benzene, a pure product of M.P. 191–192° C. was obtained. This product was found to be identical with 2,6-di-trans-4-cis-3-methyl-5-phenyl-2,4-pentadienic acid obtained in accordance with Example 1, $\lambda_{max}$ 335 m$\mu$, $\epsilon_{max}$ 50,700 (in ethanol).

Example 5

To a solution of 5.3 grams of potassium amide in 150 cc. of liquid ammonia was added a mixture of 4.8 grams of furfural and 6.4 grams of ethyl senecioate. After standing for 24 hours, ammonia was evaporated, 100 cc. of methanol was added and the solution was refluxed for 1 hour with 10 cc. of water. Thereafter, the solution was diluted with 50 cc. of water, the solvent was removed by evaporation and the residue was extracted with ethyl ether to remove the unreacted neutral parts. The remaining aqueous layer was acidified with hydrochloric acid and extracted with ethyl ether. After washing with water, the solvent was evaporated to yield 8.8 grams of oily product which solidified after a while. Upon recrystallization from benzene-petroleum benzine, 6.2 grams of 3-methyl-5-furyl-pentadienic acid, M.P. 105–106° C. was obtained. (*Analysis.*—Calculated for $C_{10}H_{10}O_3$: C, 67.4%; H, 6.0%. Found: C, 66.9%; H, 5.7%.) $\lambda_{max}$ 327 m$\mu$, $\epsilon_{max}$ 25,600 (in ethanol).

Example 6

To a solution of 5.3 grams of potassium amide in 150 cc. of liquid ammonia was added a mixture of 3.6 grams of n-butylaldehyde and 6.4 grams of ethyl senecioate. After standing for 24 hours and evaporating ammonia, 50 cc. of methanol and 10 cc. of water were added and the resulting solution was refluxed for 1 hour, after which 40 cc. of water was added and methanol was removed by evaporation. The aqueous layer was extracted with ethyl ether to remove the unreacted neutral parts, acidified with a dilute sulfuric acid solution and then extracted with ethyl ether. The ethereal extract was washed with water, dried over anhydrous sodium sulfate and concentrated. Upon a fractional distillation, the fraction of B.P. 87–92° C./0.03 mm. was collected (2.5 grams). This product consisted of a crystalline part, M.P. 70–72° C., being analyzed as C, 69.2%; H, 8.9%; and an oily part, being analyzed as C, 68.0%; H, 9.3% (cf. calculated for $C_9H_{14}O_2$: C, 70.1%; H, 9.9%), and was found to be identical with 5-n-propyl-3-methyl-2,4-pentadienic acid. $\lambda_{max}$ 260 m$\mu$, $\epsilon_{max}$ 33,000 (in ethanol).

Example 7

The procedure of Example 6 was repeated using an equivalent amount of isobutylaldehyde instead of 3.6 grams of n-butylaldehyde, other reagents being employed in the same amount. Thus, 0.9 gram of acid, B.P. 97–100° C./0.04 mm., $n_D^{26}$ 1.5143, was obtained. This product consisted of a crystalline part, M.P. 57–59° C., being analyzed as C, 70.46%; H, 9.3%; and an oily part, being analyzed as C, 70.1%; H, 9.9% (cf. calculated for $C_9H_{14}O_2$: C, 70.1%; H, 9.9%) and was found to be identical with 5-isopropyl-3-methyl-2,4-pentadienic acid. $\lambda_{max}$ 260 m$\mu$, $\epsilon_{max}$ 23,700 (in ethanol).

Example 8

The procedure of Example 6 was repeated using 5.0 grams of isohexylaldehyde instead of 3.6 grams of n-butylaldehyde, other reagents being employed in the same amount. Thus 2.6 grams of 5-isopentyl-3-methyl-2,4-pentadienic acid was obtained as the fraction of B.P. 96° C./0.03 mm. This product consisted of the crystalline part, M.P. 58° C., being analyzed as C, 70.84; H, 10.00% (cf. calculated for $C_{11}H_{18}O_2$: C, 72.6%; H, 9.9%), and the oily part. $\lambda_{max}$ 259 m$\mu$, $\epsilon_{max}$ 22,900 (in ethanol).

Example 9

Twelve grams of potassium amide was suspended in 200 cc. of absolute ethyl ether. To this was added a mixture of trans-$\beta$-ionylideneacetaldehyde (20 grams) and methyl senecioate (12 grams) and thus obtained solution was allowed to stand at room temperature. After standing for 72 hours, 50 cc. of methanol was added to it to decompose the excess amount of potassium amide and the mixed solution was hydrolyzed by refluxing for 30 minutes with a solution of potassium hydroxide in methanol (potassium hydroxide 20 g., water 20 cc. and methanol 200 cc.). The mixture was extracted with petroleum ether to remove the unreacted neutral parts, after which the aqueous layer was acidified and extracted with benzene. The benzene extract was washed with water and dried. The removal of the benzene remained a concentrated oily product, weighing 13 grams, of vitamin A acid. To the oily product was added the equal volume of ethanol or petroleum ether and the solution was allowed to stand in a refrigerator. The precipitated crystals were separated and washed with small amount of ethanol or petroleum ether. The resulting product was all-trans-vitamin A acid, M.P. 178° C. (*Analysis.*—Calcd. for $C_{20}H_{28}O_2$: C, 80.8%; H, 9.4%. Found: C, 79.3%; H, 9.2%.)

By the ultraviolet absorption spectrum, it was confirmed that the said mother liquid was almost consisted of vitamin A acid. The above-mentioned crystals had the absorption maximum at 350 m$\mu$ (in isopropanol).

Eighteen grams of thus obtained all-trans-vitamin A acid was dissolved in 70 cc. of absolute ethyl ether. To this was added a solution of lithium aluminum hydride (11 grams) in anhydrous ethyl ether (600 cc.) at $-5°$ C. After 5 minutes, the reaction mixture was diluted with water to decompose the excess amount of the reducing agent. The ethereal layer was separated and washed with dilute sulfuric acid and then with aqueous sodium bicarbonate solution. The removal of ethyl ether gave a concentrated oily product of all-trans-vitamin A, having an absorption maximum at 325 m$\mu$, in quantitative yield.

To a solution of 18 grams of all-trans-vitamin A acid prepared in accordance with this example in 100 cc. of methyl ethyl ketone, there were added 13 grams of ethyl bromide, 4.3 grams of potassium carbonate and 0.05 gram of sodium iodide and the combined solution was refluxed at 70–75° C. for 4 hours. After the removal of the solvent, the residue was added with dilute hydrochloric acid to decompose the carbonate and then thus yielded ethyl ester of vitamin A acid was extracted with ethyl ether.

Thus obtained ethyl ester of vitamin A acid was dissolved in absolute ethyl ether. To this solution was added a solution of 83 grams of di-isobutylaluminum hydride in 800 cc. of anhydrous ethyl ether at $-50°$ C. After finishing of the reduction, the mixture was added with water to decompose the excess amount of the reducing agent. The ether layer was separated, washed with acid and then with aqueous alkaline solution and dried. Upon evaporation of the solvent, a concentrate of vitamin A was obtained.

Example 10

To a suspension of 12 grams of potassium amide in 150 cc. of anhydrous ethyl ether was added a mixture of 20 grams of trans-β-ionylideneacetaldehyde, 12 grams of methyl senecioate and 50 cc. of ethyl ether. After standing for 72 hours at room temperature, 100 cc. of methanol was added to it to decompose the excess amount of potassium amide and the solution was hydrolyzed by refluxing for 1 hour with a solution of 10 grams of potassium hydroxide in 10 cc. of water. The resulting solution was diluted with 200 cc. of water and extracted with petroleum ether to remove the unreacted neutral parts, after which the aqueous layer was acidified with dilute sulfuric acid and extracted with benzene. The benzene extract was washed with water and dried over anhydrous sodium sulfate. The removal of the solvent yielded 26 grams of acid as an oily product. To the oily product 20 cc. of ethanol or petroleum ether was added and the solution was allowed to stand in a refrigerator for one night to precipitate the crystalline mass. The crystals were collected and washed with a small amount of the above-mentioned solvent. Thus 12 grams of all-trans-vitamin A acid, M.P. 178° C. was obtained as yellow crystals. The major part of 8 grams of crystals obtained from the said mother liquid was found also to be vitamin A acid, $\lambda_{max}$ 345 m$\mu$. The combined crystals were recrystallized from methanol. Thus, 15 grams of pure all-trans-vitamin A acid, M.P. 182–183° C., $\lambda_{max}$ 348m$\mu$, $\epsilon_{max}$ 46,300 (in ethanol), and 3 grams of 2-cis-vitamin A acid, M.P. 175–176° C., $\lambda_{max}$ 352m$\mu$, $\epsilon_{max}$ 38,800 (in ethanol) were obtained.

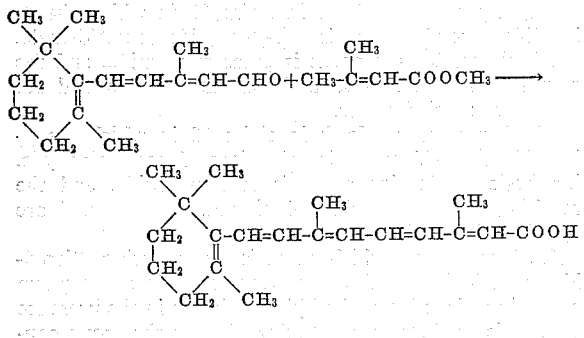

Example 11

In the same manner as described in Example 10, 20 grams of cis-β-ionylideneacetaldehyde, 12 grams of methyl senecioate, 12 grams of potassium amide and 200 cc. of anhydrous ethyl ether were reacted. After standing for 72 hours at room temperature, 50 cc. of methanol was added to decompose the excess amount of potassium amide, and the resulting mixture was hydrolyzed by refluxing for 30 minutes with a solution of 20 grams of potassium hydroxide, 20 cc. of water and 200 cc. of methanol. The solution was extracted with petroleum ether to remove the unreacted neutral parts and the aqueous layer was acidified with dilute sulfuric acid and extracted with benzene. The benzene extract was washed with water and dried over anhydrous sodium sulfate. The removal of the solvent remained a concentrated oily product, 6-cis-vitamin A acid, weighing 18 grams. To the oily product was added 18 cc. of ethanol or petroleum ether and the solution was allowed to stand in a refrigerator for one night to precipitate the crystalline mass. The crystals were collected and washed with a small amount of the same solvent as the mother liquid. Thus 10 grams of yellow crystals was obtained. By recrystallization from ethanol the crystals of M.P. 188° C., $\lambda_{max}$ 345 m$\mu$, $\epsilon_{max}$ 36,900 (in ethanol) were obtained. The majority of the crystals obtained from said mother liquid was also found to be vitamin A acid from its ultraviolet absorption spectrum analysis. Thus obtained crystals were directly or after converting into the corresponding ester were reduced to 6-cis-vitamin A alcohol in almost quantitative yield by using lithium aluminum hydride in ethyl ether at −5° C.

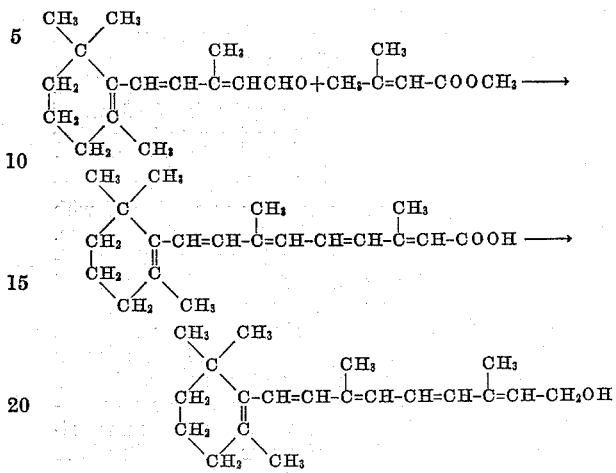

Example 12

Six and seven-tenths grams of potassium amide was dissolved in 150 cc. of liquid ammonia. To this solution was added a mixture of 14 grams of trans-β-ionylideneacetaldehyde, 10 grams of ethyl senecioate and 50 cc. of ether. After standing for 72 hours and evaporating ammonia, 100 cc. of methanol was added and the solution was hydrolyzed by refluxing for 45 minutes with a solution of 10 grams of potassium hydroxide in 10 cc. of water. After cooling, 150 cc. of methanol was added and the resulting solution was extracted with petroleum ether to remove the unreacted neutral parts. To the remaining methanol layer was added 300 cc. of water and after removal of the solvent the residue was acidified with a solution of 10 cc. of concentrated sulfuric acid in 500 cc. of water. As the oily product was separated from the solution, the product was extracted with benzene and the benzene extract was washed with water. The removal of benzene under reduced pressure remained a concentrated oily product, weighing 17 grams, of all-trans-vitamin A acid. To this was added 17 cc. of ethanol or petroleum benzene or petroleum ether and the combined solution was allowed to stand in a refrigerator for one night to precipitate the yellow crystals of all-trans-vitamin A acid. The crystals were collected and washed with a small amount of the same solvent as the mother liquid. Thus, 10 grams of crystals, M.P. 178° C., was obtained. Upon recrystallization from methanol, 8.5 grams of all-trans-vitamin A acid, M.P. 182–183° C. and a little amount of 2-cis-vitamin A acid, M.P. 175–176° C. were obtained. As the result of ultraviolet absorption test, said mother liquid was found to be vitamin A acid for the most part.

Thus obtained all-trans-vitamin A acid was converted into all-trans-vitamin A in the same manner as the above-described examples.

Example 13

The procedure of Example 12 was repeated using 5.5 grams of sodium amide in stead of 6.7 grams of potassium amide. Thus 9 grams of 2-cis-vitamin A acid was obtained as a concentrated oily product, from which 4.5 grams of crystalline 2-cis-vitamin A acid, M.P. 175–176° C., was obtained.

Another experiment using an equivalent amount of lithium amide instead of sodium amide afforded 6 grams of 2-cis-vitamin A acid as an oily product, from which 3 grams of crystalline 2-cis-vitamin A acid was obtained, M.P. 175–176° C.

From the acid thus obtained, 2-cis-vitamin A was obtained in the manner similar with that described in the above examples.

Example 14

To a solution of 5.2 grams of potassium amide in 150 cc. of liquid ammonia was added a mixture of 8 grams of cis-β-ionylideneacetaldehyde and 5 grams of methyl senecioate. After standing for 72 hours and evaporating ammonia, 50 cc. of methanol was added and then the solution was hydrolyzed by refluxing for 1 hour with a solution of 5 grams of potassium hydroxide in 5 cc. of water. The mixture was extracted with petroleum ether to remove the unreacted neutral parts, after which the remaining methanol layer was diluted with water. After the removal of methanol, the solution was acidified with dilute sulfuric acid solution and extracted with benzene. The benzene extract was washed with water and the solvent was removed by an evaporation under a reduced pressure to yield a concentrated oily product, weighing 11 grams, of 6-cis-vitamin A acid. To this was added 10 cc. of ethanol or petroleum ether and the solution was allowed to stand in a refrigerator for one night to precipitate the crystals. The crystalline mass was collected and washed with a small amount of the same solvent as mother liquid. Thus, 6 grams of 6-cis-vitamin A acid was obtained as yellow crystals. Upon recrystallization from ethanol the pure compound, M.P. 188° C., was obtained, $\lambda_{max}$ 345 m$\mu$, $\epsilon_{max}$ 36,900 (in ethanol). (*Analysis.*—Calculated for $C_{20}H_{28}O_2$: C, 80.0%; H, 9.4%. Found: C, 79.6%; H, 9.3%).

From the product thus obtained was obtained 6-cis-vitamin A in quantitative yield in the same manner as the above-described examples, $\lambda_{max}$ 324 m$\mu$.

Example 15

The procedure of Example 14 was repeated using an equivalent amount of sodium amide. Thus 6 grams of crude 2,6-di-cis-vitamin A acid was obtained from which 3 grams of pure product, M.P. 135–136° C, $\lambda_{max}$ 346 m$\mu$, $\epsilon_{max}$ 34,500 (in ethanol) was obtained. The cis-acid was converted into 2,6-di-cis-vitamin A alcohol just like above-described examples.

I claim:

1. A process for preparing a polyene-carboxylic acid derivative of the formula

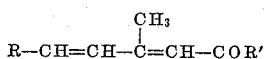

wherein R is a radical selected from the group consisting of propyl, isopropyl, iso-pentyl, β-ionylidenemethyl, phenyl, styryl and furyl, and R' is a member selected from the group consisting of methoxy and ethoxy radicals, comprising condensing an aldehyde of the formula, RCHO, wherein R is the same with above-identified, with a member selected from the group consisting of methyl and ethyl senecioates in the presence of a basic condensing agent selected from the group consisting of sodium amide and potassium amide.

2. The process set forth in claim 1 in which said aldehyde is benzaldehyde.

3. The process set forth in claim 1 in which said aldehyde is cinnamic aldehyde.

4. The process set forth in claim 1 in which said aldehyde is n-butyl aldehyde.

5. The process set forth in claim 1 in which said aldehyde is iso-butyl aldehyde.

6. The process set forth in claim 1 in which said aldehyde is iso-hexyl aldehyde.

7. A process set forth in claim 13 in which the basic condensing agent is potassium amide, and the resulting vitamin A acid is 2,4-di-trans-isomer.

8. A process set forth in claim 13 in which the basic condensing agent is sodium amide, and the resulting vitamin A acid is 2-cis-4-trans-isomer.

9. A process set forth in claim 13 in which the β-ionylideneacetaldehyde is trans-β-ionylideneacetaldehyde, the basic condensing agent is potassium amide, and the resulting vitamin A acid and vitamin A compound are all-trans-isomers.

10. A process set forth in claim 13 in which the β-ionylideneacetaldehyde is trans-β-ionylideneacetaldehyde, the basic condensing agent is sodium amide, and the resulting vitamin A acid and vitamin A compound are 2-cis-4,6-di-trans-isomers.

11. A process set forth in claim 13 in which the β-ionylideneacetaldehyde is cis-β-ionylideneacetaldehyde, the basic condensing agent is potassium amide, and the resulting vitamin A acid and vitamin A compound are 2,4-di-trans-6-cis-isomers.

12. A process set forth in claim 13 in which the β-ionylideneacetaldehyde is cis-β-ionylideneacetaldehyde, the basic condensing agent is sodium amide, and the resulting vitamin A acid and vitamin A compound are 2,6-di-cis-4-trans-isomers.

13. The process which comprises condensing β-ionylideneacetaldehyde with a member selected from the group consisting of methyl and ethyl senecioates in the presence of a basic condensing agent selected from the group consisting of sodium amide and potassium amide.

References Cited in the file of this patent

UNITED STATES PATENTS 2,662,914    Robeson _____ Dec. 15, 1953